United States Patent [19]

Celette

[11] Patent Number: 5,295,073
[45] Date of Patent: Mar. 15, 1994

[54] DEVICE FOR CHECKING THE POSITION OF VARIOUS POINTS OF A VEHICLE

[75] Inventor: Germain Celette, Vienne, France

[73] Assignee: Celette S.A., France

[21] Appl. No.: 770,451

[22] Filed: Oct. 3, 1991

Related U.S. Application Data

[63] Continuation-in-part of Ser. No. 497,235, Mar. 22, 1990, Pat. No. 5,140,533.

[30] Foreign Application Priority Data

Mar. 24, 1989 [FR] France .................. 89 04210

[51] Int. Cl.⁵ .................. G06F 7/70; G01B 11/14
[52] U.S. Cl. .................. 364/424.01; 364/560; 356/375; 356/400
[58] Field of Search .................. 364/424.01, 571.02, 364/558, 513, 551, 559, 560; 356/375, 400

[56] References Cited

U.S. PATENT DOCUMENTS

| 4,492,471 | 1/1985 | Wiklund | 356/375 |
|---|---|---|---|
| 4,498,242 | 2/1985 | Celette | 33/288 |
| 4,585,350 | 4/1986 | Pryor | 356/375 |
| 4,600,299 | 7/1986 | Abshire | 356/28 |
| 4,669,809 | 6/1987 | Patry et al. | 340/870.29 |
| 4,729,660 | 3/1988 | Tsumura et al. | 356/375 |
| 4,811,250 | 3/1989 | Steber et al. | 364/551 |
| 4,841,460 | 6/1989 | Dewar et al. | 364/559 |
| 4,997,283 | 3/1991 | Danielson et al. | 356/375 |
| 5,052,807 | 10/1991 | Juday | 356/375 |

Primary Examiner—Thomas G. Black
Assistant Examiner—Tan Q. Nguyen
Attorney, Agent, or Firm—Harris Beach & Wilcox

[57] ABSTRACT

A laser telemeter is driven on two mutually orthogonal axes by stepper motor assemblies to acquire targets mounted at predetermined points on a vehicle. The distances to the targets and the angular orientations are obtained. A computer equipped with a microprocessor controls the movement of the stepper motors by storing in memory the number of steps made during rotation about each axis, and calculates, from the distance between the telemeter and each point, and from the angles of rotation of the beam between the various points measured, the distance between at least two points. These are automatically compared with known standard distances to obtain discrepancies which indicate the deformation of the vehicle. The targets can be disks with back-reflective material thereon as a peripheral ring and a central dot.

14 Claims, 5 Drawing Sheets

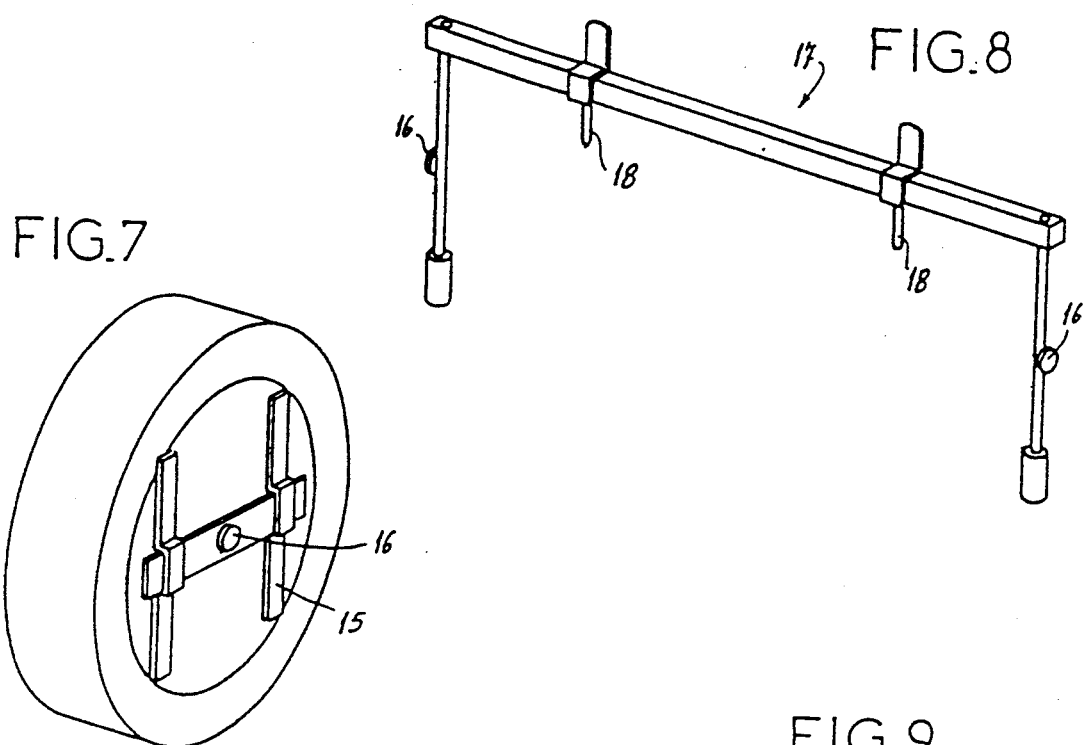
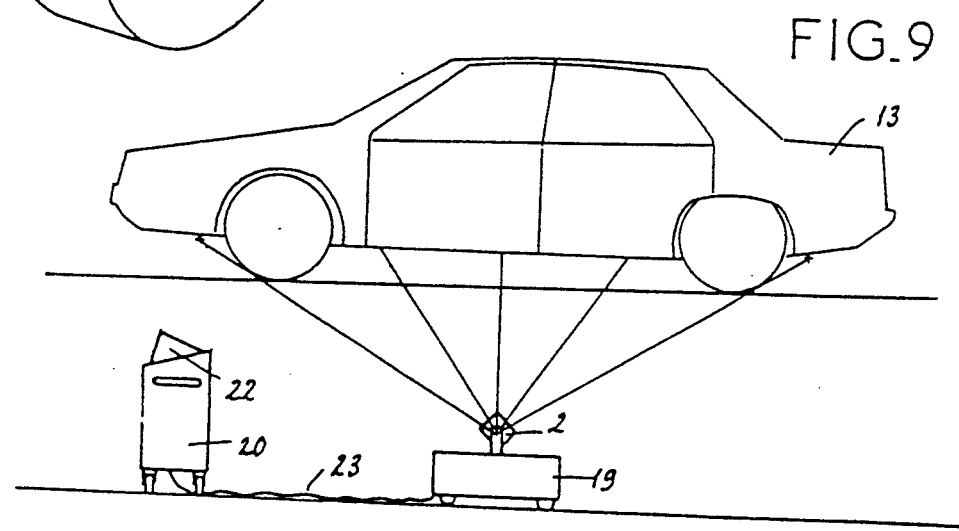
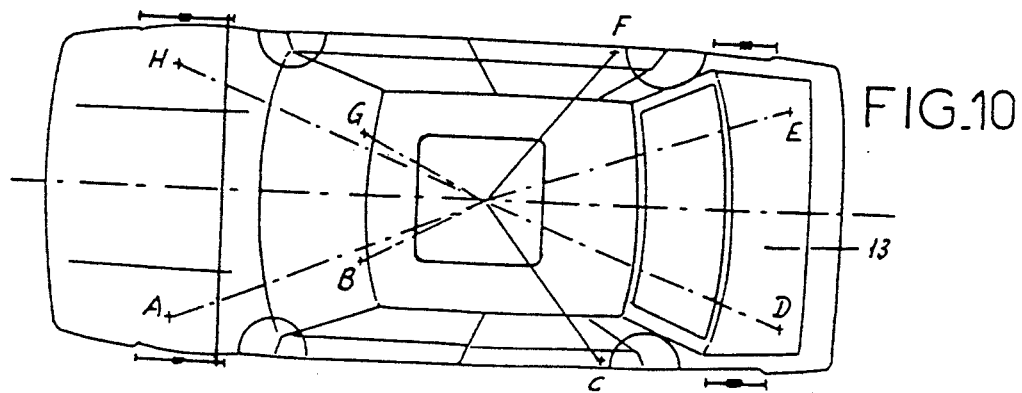

CIRCUIT OF COMMAND BY THE COMPUTER TO THE ENGINES

INTERFACE ALLOWING THE COMPUTER TO COMMAND AND RECEIVE INFORMATION FROM THE TELEMETER

DEVICE FOR CHECKING THE POSITION OF VARIOUS POINTS OF A VEHICLE

This is a continuation-in-part of my copending application Ser. No. 07/497,235, filed Mar. 22, 1990, now U.S. Pat. No. 5,140,533.

BACKGROUND OF THE INVENTION

The present invention relates to a device for checking the position of various points of a vehicle, the term vehicle being taken in a broad sense and covering both automotive vehicles and other types of vehicles such as boats, motorcycles, aircraft or parts thereof.

In order to ensure the safety of road users, it would be advantageous to make systematic tests of the vehicles, by periodically inspecting the symmetry of the vehicle with respect to its longitudinal axis as well as the proper position of a certain number of characteristic points.

It is nowadays only after a vehicle has been in a serious accident that an exact check thereof is made, by "putting it through on the surface plate."

When an automotive vehicle has been in an accident, it is desirable to make a controlled alignment of the deformed parts, so that they will be brought back to their original positions. To this effect, one conventionally uses a surface plate comprising a rectangular chassis of metal on which the vehicle is mounted by means of four jaws which clamp the underbody. The longitudinal, lateral and vertical dimensions of the four jaws is a function of the type of vehicle to be repaired. After the vehicle has been correctly positioned and fixed on the surface plate, a measuring frame with longitudinal graduations is positioned on the surface plate and under the vehicle. After the frame has been positioned relative to the vehicle with respect to three adjustment points serving as references, taken in an undeformed part of the vehicle, the chassis is blocked on the surface plate. On the measuring frame, graduated rulers are intended to be fixed transversely, on which can slide vertically adjustable cursors carrying measuring fingers or posts ("towers") whose height position is marked by a graduated index.

For each type of vehicle the repairman has available the three dimensions of a certain number of characteristic points, as well as accessory ones intended for measuring each point. The various values are read, respectively, on the longitudinal rulers, on the transverse rulers, and on the posts.

This procedure is not entirely satisfactory, for a number of reasons. First of all, it necessitates purely manual measuring, sometimes done in zones difficult to reach, which may cause errors. Also, in view of the deformations of the vehicle and the presence of the means for securing, aligning and checking it, it is not possible to get to all points of the body and of the chassis. Then, it is necessary to calculate, from the reference coordinates, the coordinates of the points identified on the technical data sheet, which is lengthy and tedious and may be another source of error. Also, the operator must compare the values of the measurement performed to the values of the measured point appearing on the reference sheet.

OBJECTS AND SUMMARY OF THE INVENTION

It is an object of the invention to provide a device for checking the position of several points of a vehicle, which method does not require mounting the vehicle on a measuring chassis, nor contact between the measuring tools and the vehicle, but which enables the inspector or repairman to obtain qualitative and quantitative information by determining, on the one hand, if the vehicle is deformed and what part of it is deformed, and on the other hand, what the value of the displacement of the measured points is relative to the manufacture's reference.

To this effect, the device in question comprises:

a telemeter for measuring range or distance from it to each point to be measured, means for orienting the telemeter about two perpendicular axes of rotation, e.g. to measure azimuth and elevation, two stepping and reducing motor assemblies for accurately carrying out the two rotational movements, and a computer equipped with a microprocessor suitably programmed to:

acquire each distance measurement measured by the telemeter, control the movement of the stepping motors by storing in memory the number of steps carried out during the rotation about each axis, and calculate, from the distance between the telemeter and each point, and from the angles of rotation (i.e., azimuth and elevation) of the telemeter beam between the various points measured, the distance between at least two points, or the coordinates of at least one point relative to a previously measured point.

According to one embodiment, this device comprises a laser telemeter, and the points whose distance from the telemeter is to be measured are equipped with targets reflecting the light of the laser beam back in its direction of emission. The targets are designed so that the telemeter can acquire them automatically, and then center the beam on the target automatically.

Advantageously, the computer is equipped with means for storing in memory theoretical values of the coordinates of a predetermined number of points or of the distances between certain predetermined points of the vehicle, and with means for comparing the measured values with these stored theoretical values with one another.

It is thus possible to carry out various types of vehicle testing, without contact with the vehicle, such as: measurement of lateral distances (centerline distances of wheels, door hinges, angles of window panes, ends of drip moldings); measurement of points situated under the chassis of the vehicle; measurement of parallelism of wheels, of camber angles, of caster angles and striking angles of the steerable wheels.

According to an aspect of this invention, this device comprises a reflecting target intended to be secured at each point of the vehicle belonging to a series of measurements. This target, which favors the reflection of the laser beam and permits proper positioning thereof, can be secured by magnetic means, by temporary gluing, or by wedging, depending on the configuration of the environment of the measurement point.

It addition, and to permit automatic centering of the laser beam on each target, the telemeter is designed also to measure the light intensity of the laser beam received, the computer being arranged to control the stepping motors for positioning the laser beam, thereby displacing the beams relative to a target, until the maximum light intensity is received.

Prior to measuring a point, it suffices, therefore, for the operator to simply aim roughly at this point with the aid of the laser beam, and then to control the automatic sequence of aiming at the point to be measured.

According to a first embodiment of this device, the telemeter is mounted on a turret or support articulated on two perpendicular axes of rotation, i.e., azimuth and elevation, the point of intersection of these two axes coinciding with the point of origin of the measurement of the telemeter.

According to a second embodiment of this device, the telemeter is mounted on a fixed support and the laser beam is directed onto a mirror articulated about two perpendicular axes, the point of intersection of which coincides with the point of impingement of the laser beam on the mirror.

As the mirror is easier to displace than the telemeter, this second embodiment permits the use of smaller, less powerful motors, a lighter articulation system, and simplifies the adjustment of the coincidence of the point of impingement of the laser beam with the intersection of the two axes of rotation.

According to another aspect of the invention, an electronic device permits, on demand of the computer, to reflect onto the receiver a portion of the beam from the transmitter along a known path, thereby proving means of calibration. This permits making measurement and calculating independent of the possible variations over time of such parameter as temperature or atmospheric pressure.

Preferably this device comprises a carriage on which the telemeter is mounted. For performing measurement under the vehicle, the carriage should advantageously be as low as possible, in order not to have to raise the vehicle too high. In this case, the control console is mounted separately from the carriage. Conversely, in the case of a device intended to perform lateral measurements, the control console, screen and keyboard can all be mounted on the carriage. The computer and the printer, for printout of the measurement results, can set up in a fixed, remote location.

Another possibility, for carrying out lateral measurements, is to arrange a tunnel in which two telemeters, controlled by the same computer, are each mounted on fixed supports.

In any event, the invention will be well understood by means of the description which follows, with reference to the annexed figures of Drawing showing, by way of non-limiting examples, several forms of execution of this device:

BRIEF DESCRIPTION OF THE DRAWING

FIG. 7 shows a target device intended to ensure aiming at the center of a wheel;

FIG. 8 shows a tool permitting aiming, with the aid of a measuring device, by taking into account the points of attachment of a MacPherson strut;

FIG. 9 and 10 are two views of a vehicle from the side and from above respectively, showing inspection from below;

DETAILED DESCRIPTION OF THE PREFERRED EMBODIMENT

Figure 1:
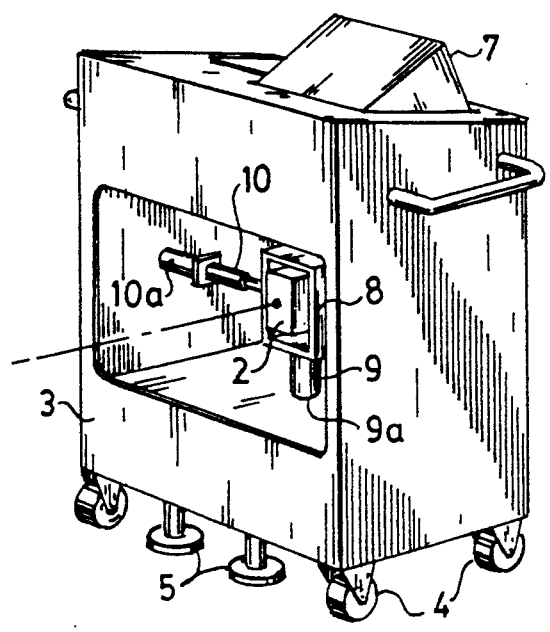
FIGS. 1 and 2 are two perspective three quarter front and three-quarter rear views of a measuring and control device according to one embodiment, here mounted on a carriage.
Figure 2:
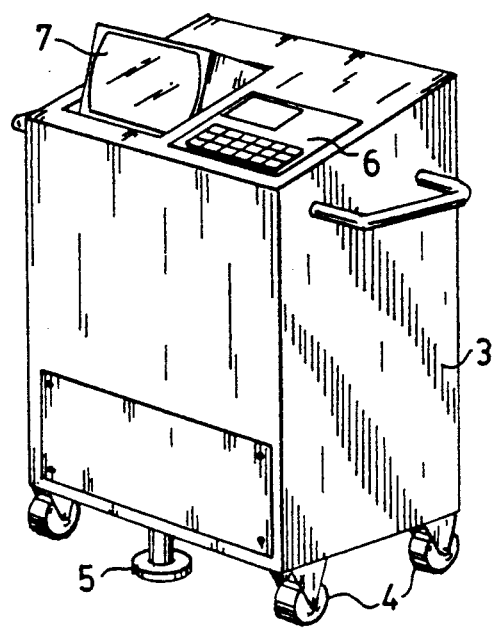

The device according to this invention comprises at its heart a laser telemeter 2 which, in the embodiment represented in FIGS. 1 and 2, is mounted inside a chassis of a carriage 3 equipped with wheels 4 and three telescoping legs 5 intended to assure the stability of the carriage during measurement.

In the top face of the carriage are mounted a control console 6 and a monitor 7. The telemeter 2 is intended to measure its distance from a point to be measured.

The distance measurement is carried out by measuring the propagation time of the telemeter beam laser, this measurement being then reduced to a phase shift measurement. This is explained basically as follows. If D is the distance to be measured and c is the speed of light, the propagation time t is equal to:

$$t = 2D/c.$$

A resolution of 0.1 mm implies a resolution in time of the order of 0.6 picoseconds. In view of the smallness of this value, it is preferred to employ a phase shift measurement on a high-frequency carrier wave. To this effect, the beam of the laser diode forming the transmitter is high-frequency modulated, diffused by the target, modulated at the same frequency, picked up by the photo-receiver, and amplified.

The propagation time then appears in the form of a phase shift of two high-frequency signals, the phase measurement being performed at low frequency, by heterodyne action, or bringing about a change of frequencies on the two high-frequency signals, which does not modify the phase shift.

Thus, the distance sought is directly proportional to the measured phase shift.

Furthermore, an electronic device integrated in the measuring head of the telemeter 2 permits returning to the receiver, on demand of the control means, a portion of the beam from the transmitter over a known path, thus providing a possibility of simple calibration whereby one can automatically compensate for any variations in time of such parameters as temperature of atmospheric pressure.

This apparatus supplies two measurements upon demand:

a measurement of the distance separating the receiving diode from the target aimed at with a precision of the order of 0.2 mm for distances varying between about 0 to 5 m;

a measurement of light intensity of the laser beam received by the apparatus. This measurement is utilized for carrying out the automatic centering of the beam on the target. To permit this centering, the targets are shaped for increasing the reflection of the laser beam in the direction of the telemeter. The surface of each target is reflecting, made up for example of glass balls of small diameter and a black ring is imprinted in the center of the target, to make a peripheral ring of reflective material. This produces a reflection of maximum intensity at this level.

Figure 3:
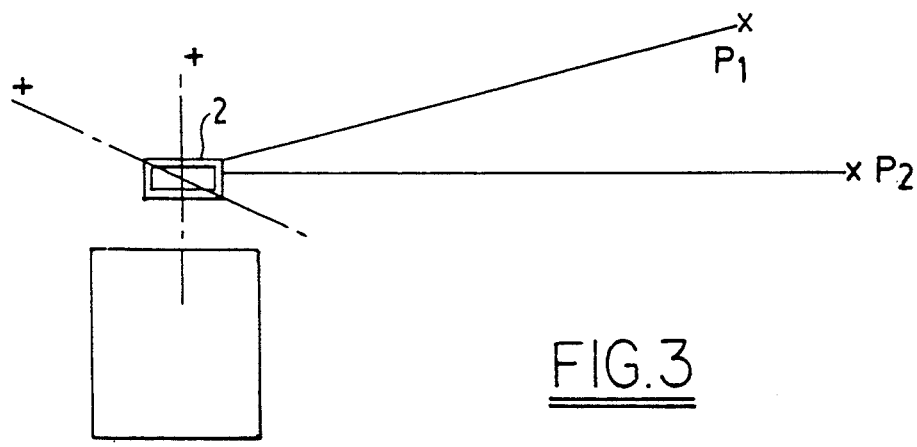
FIGS. 3 and 4 are two schematic views showing two embodiments of the telemeter, the embodiments varying as to orientation of the laser beam.

In order to sweep a very wide space with the laser beam, the telemeter is mounted on a support 8 articulated on two perpendicular axes of rotation 9 and 10. For the point of origin of the measurement to remain fixed when the telemeter is driven in rotation about the two axes, the point of intersection of these two axes coincides with the point of origin of the measurements of the telemeter 2. Such an arrangement is represented in FIG. 3.

Figure 4:
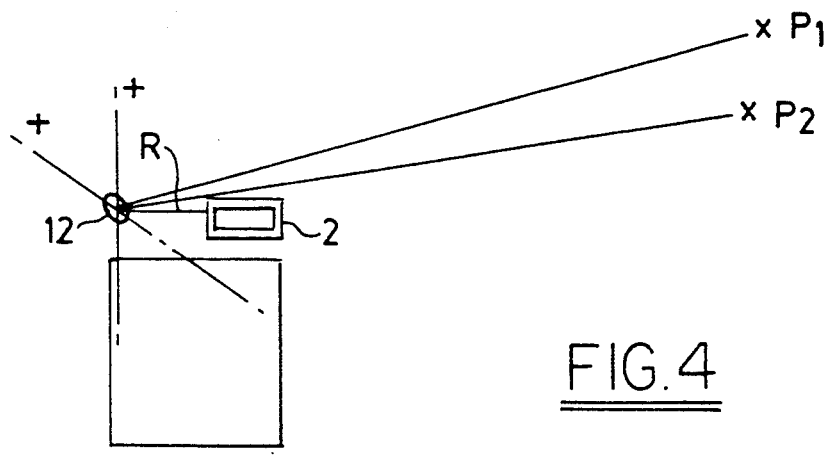

Another possibility for obtaining the movement of the laser beam is shown schematically in FIG. 4. In this case the telemeter 2 is fixed and the laser beam R is directed to a mirror 12 which is articulated on two perpendicular axes whose intersection coincides with the point of impingement of the beam on the mirror.

Whichever solution is envisaged, the rotation is ensured b two stepping and reducing motor assemblies 9a, 10a mounted at the ends of the axes 9, 10, in order to control their respective angular displacements with excellent precision (±0.001° of angle), between the sighting of a point P1 and that of a point P2.

This device also comprises a computer equipped with a microprocessor. This computer is suitably programmed to control the fine adjustment of the telemeter and to acquire the measurement thereof;

control the stepping motor and the storing in memory of the number of steps carried out for each axis;

calculate the distances between the various measured points;

compare these distances with one another or with theoretical values;

calculate the coordinates of at least one point relative to an initial measurement point;

store in memory pre-programmed theoretical values by make and by year of the vehicle (these are supplied by the vehicle manufacturer);

generate a display of the results obtained with date and hour; and generate a print-out of the results obtained with date and hour on a printer.

Figure 5:
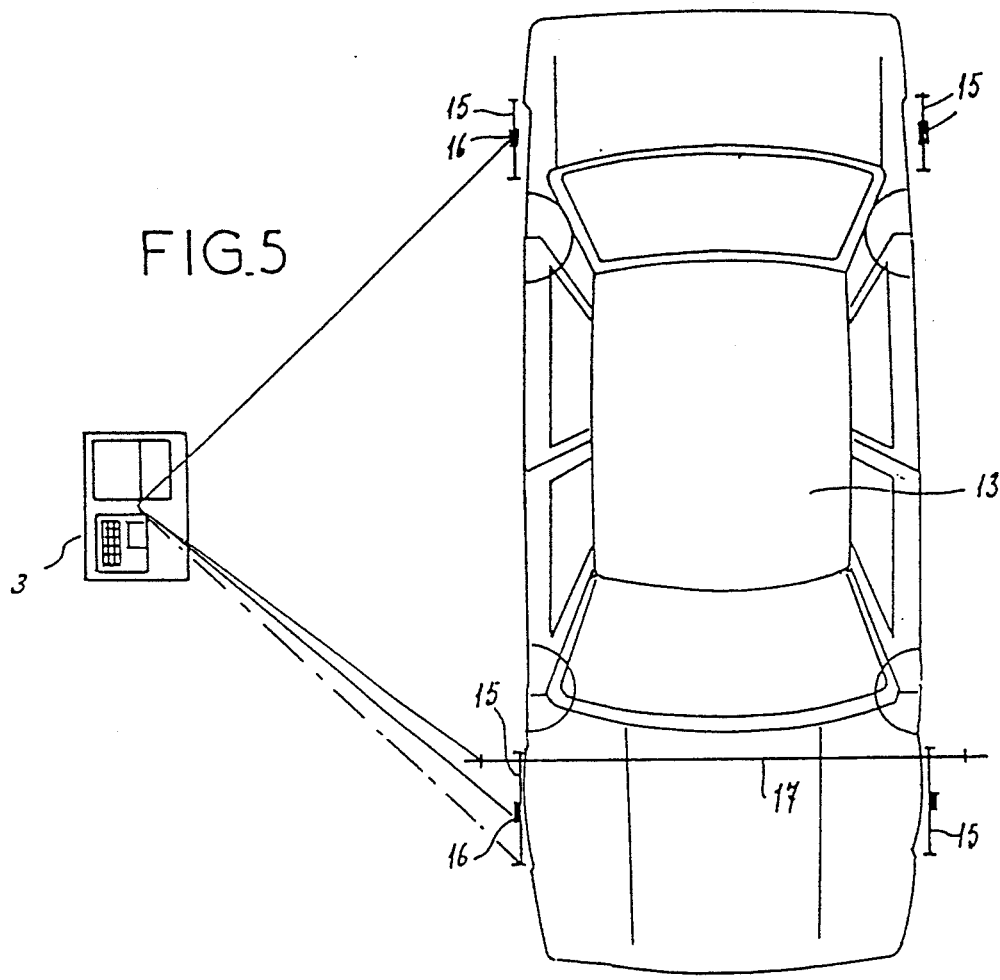
FIGS. 5 and 6 are views, respectively, from above and from the front, during lateral checking of a vehicle.
Figure 6:
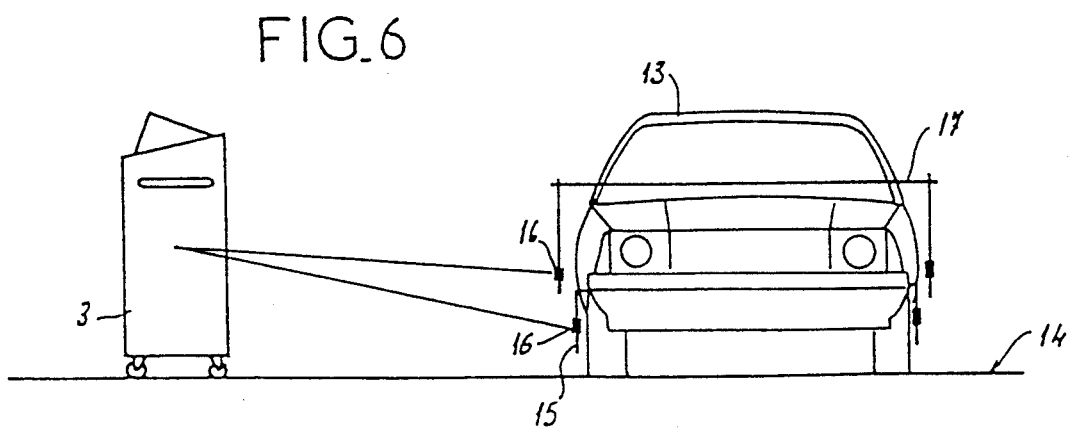

FIGS. 5 and 6 show how to make lateral measurements on a vehicle 13. The vehicle 13 is shown with its wheels on the ground, i.e, on an approximately plane surface 14. The operator positions the carriage 3 containing the measuring and control apparatus on one of the two sides of the vehicle at a distance therefrom sufficient for the beam to be displaced successively toward the various points to be measured.

If it is desired to measure the distance between the two front and rear wheels, one places on the rims of the vehicle a mounting piece 15 (FIG. 7) whose central portion situated at the vehicle axle has a target 16 thereon which reflects the light of the laser beam back in the direction from which it came. The operator brings the laser beam roughly onto the first target 16. He then pushes a function key of the console to trigger the automatic search of the center of the target, so as to bring about the automatic positioning of the beam on the target center.

After validation of the measurement, the operator orients the beam to aim at the other target, and repeats the automatic centering and measurement function. After validation, and insofar as only the distance between the axles of two wheels is to be measured, the operator controls the calculation of this length on the computer, which is obtained by taking into account the distance between the telemeter and each target, and the angles by which the telemeter has been pivoted to get from one target to the other.

In the course of the same operation, it is possible to aim at a target 16 mounted on a tool 17 (FIG. 8) in the form of a gantry having support devices 18 which take support on the points of attachment of the MacPherson struts or shock absorbers.

When the measurements have been made on one side of the vehicle, the carriage is brought to the other side thereof in order to perform the corresponding measurements, which are then compared by the computer.

In the case of a testing tunnel, two telemeters may be provided on either side of the tunnel, between which the vehicle passes. The operator need no longer handle carriages, and the two telemeters, controlled by the same computer, furnish an immediate result.

The same procedure can be used to check the body itself of a vehicle. It suffices then to point the laser beam at precise characteristic points of the body, such as door hinges, ends of drip moldings, windshield or window pane angles, etc.

It is possible to compare the calculated distances between one side of the vehicle and the other, or to compare these distances with theoretical reference values.

The device according to the invention also permits in-depth lateral measurements, with the vehicle no longer resting on its wheels, i.e., with the wheels being taken off, the wheel tools 15 being now arranged on the hub or brake disk rather than on the wheel.

It is also possible to make measurements of wheel parallelism, of camber angle, or caster angle or angle of striking of the steerable wheels, whether or not they are driving wheels.

To this effect, it is desirable to have available a target-holding tool, with a target in the center of the tool and several targets, for example four, arranged in a circle centered on the axle of the wheel. The measuring procedure is identical with that indicated before, but it permits in addition, by involving the rotation of the hub, to check out-of-round or buckling of wheels, to compare angles and lengths between front and rear axles, and to check the angles when the steerable wheels strike.

FIGS. 9 and 10 illustrate a method of checking the vehicle from below.

To this end, the vehicle 13 is placed on a hoist (not shown in the drawing) and a carriage 19 carrying the single telemeter 2 is slid under the vehicle substantially at the center thereof. A carriage 20 with the control console 22 is connected by a cable 23 to the carriage 19. It is possible to make sightings on a certain number of significant points of the chassis of the vehicle, of which there are eight in the embodiment represented in the drawing and which are referenced from A to H.

Starting with a point which belongs to an undeformed zone of the vehicle, the operator successively makes measurements at other points, the computer having in memory the theoretical or factory coordinates of the various points, thereby supplying any deviation between the measured position and the theoretical position.

If, for an unusual type of vehicle, the operator does not have measurement data sheets, he can nevertheless make a very exact check of the symmetry of the vehicle by comparing the respective lengths between several points situated on one side of the vehicle and on the other side of the vehicle, and also by calculating, with respect to the axis of symmetry of the vehicle, the crossing point between the corresponding lines intersecting this axis of symmetry.

All these types of measurements and the utilization of their results are functions of the data processing programs of the computer.

Figure 11:
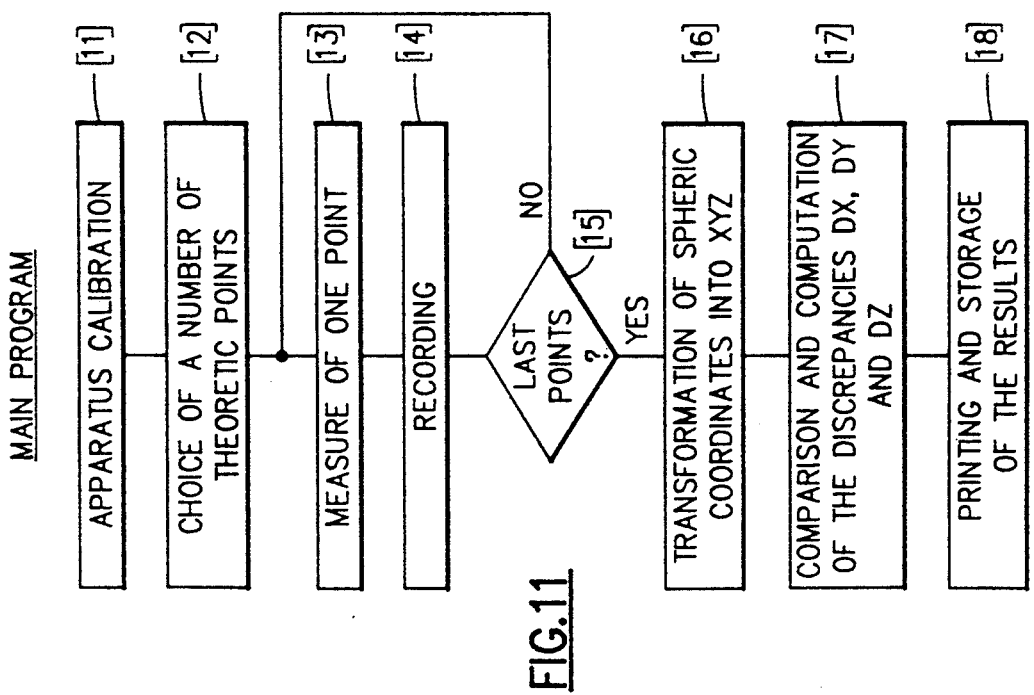
FIG. 11 is a flow chart for explaining the computer-controlled operation of the technique of the present invention.

The procedure of this invention can be explained with the flow chart of FIG. 11.

1. Calibration (Step [11])

At the beginning of the procedure, the computer guides the stepper motors 9a, 10a in order to bring the telemeter 2 into a predetermined position. At this position, measurement of distance is performed on a target 16, which is made especially for this purpose and is always located at the same position in order to ensure that the apparatus is operating correctly.

2. Entering Theoretical Data for Vehicle (Step [12])

Once calibration is completed, the operator enters into the computer the data corresponding to the vehicle to be checked. This can be accomplished in any of a variety of ways:
  selection of stored database
  input of floppy disk
  input of memory card
  loading from a remote site (using modem).

3. Measurement of Actual Locations

The operator aims the laser beam of the telemeter 2 at a first one of the targets 16 (Step [13]). For this action, the operator employs the computer which sends driving commands to the stepper motors. When the laser beam strikes the target, the operator commences the automatic centering procedure on the target. Once centering is completed the computer performs a measurement computation for distance and records the alpha and beta angles (representing azimuth and elevation) of the telemeter turret.

The computed distance and angles are stored (Step [14]). These three value represent the spherical coordinates of the center of the target relative to the telemeter.

The procedure of steps [13] and [14] is repeated for each target 16 in turn until all data points have been obtained (Step [15]).

Then the program stored in the computer transforms the spherical coordinates into cartesian (X, Y, Z) coordinates (Step [16]), so that the measured and theoretical position can be compared to yield discrepancies DX, DY, DZ (Step [17]). The computer can generate a report describing these discrepancies.

The theoretical (stored) coordinates correspond to an XYZ graph $R_T$. The measured coordinates are computed from another graph $R_M$. The computer program computes the transformation that will allow expression of the measured coordinates in terms of the theoretical graph $R_T$. At this point the computer has computed, for each point measured, the discrepancies DX, DY, DZ versus the theoretical position. The computer then generates and prints out a report (Step [18]) describing these discrepancies.

Figure 12:
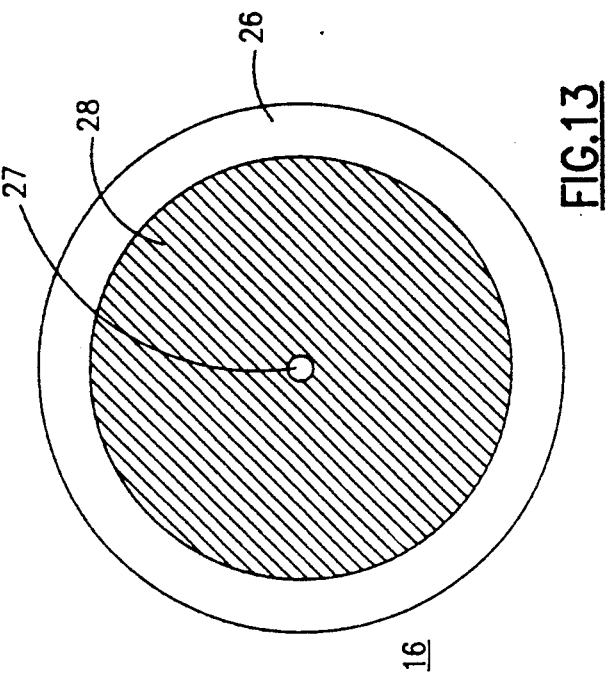
FIG. 12 is a schematic view of a target employed with this invention.
Figure 13:
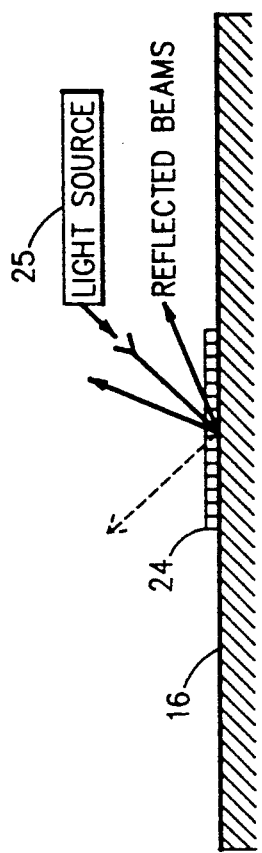
FIG. 13 is a plan view of the target.

The principle of automatic centering of the telemeter laser beam can be explained with reference to FIGS. 12, 13, and 14. As mentioned before, the targets 16 are formed of a hard material and are at least partly covered with reflective materials, e.g. a reflective film 24. This film 24 reflects back a light beam towards its source 25 regardless of the angular orientation of the incident beam to the target 16.

Acquiring the target 16 is critically important for the automatic centering procedure. For this reason the target 16 is favorably constructed as shown in FIG. 13. In this case, the target 16 is a disk having an annular crown 26 of reflective material around its periphery, and a central dot 27 of reflective material, the latter having a diameter on the order of two to three millimeters. The remaining annular surface 28 is darkened so as to cut down reflected light.

Figure 14:
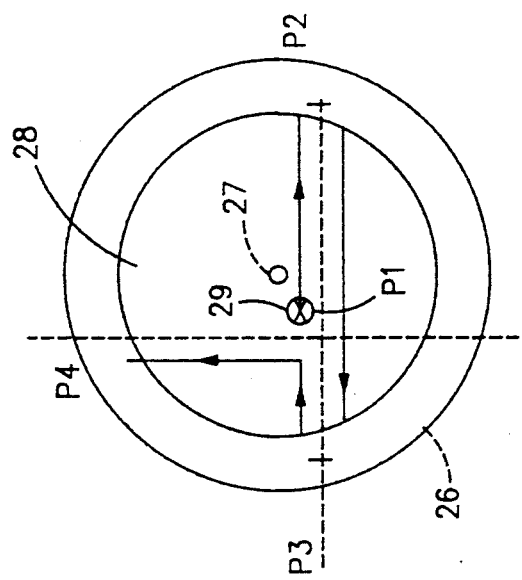
FIG. 14 illustrates the automatic centering procedure of this invention.

With reference to FIG. 14, the automatic centering procedure starts after the laser spot 29 (point of impact of the laser) is brought within the target 16, that is, inside the darkened area 28, at any point which we will call P1.

From then on, the system moves the spot 29 slowly along any given straight line, while measuring the reflected light intensity. As long as the beam hits the darkened area, there is little or no reflection. When the laser spot 29 reaches the peripheric crown 26 the intensity increases sharply and allows to measure the distance. The system then records the position of a point P2. The spot is brought back to P1 and moved in the opposite direction. Thus, on the other side of the target 16, the system determines a point P3. The spot is moved back again to point P1 and then moved perpendicularly to the segment (P2, P3) until it encounters again the peripheric crown of the target, at point P4. Knowing the target diameter and position of the points P2, P3, P4, the position of center dot 27 of the target is easily computed.

The telemeter 2 is pointed on this center dot 27 and the measurement of distance can now be performed.

Figure 15:
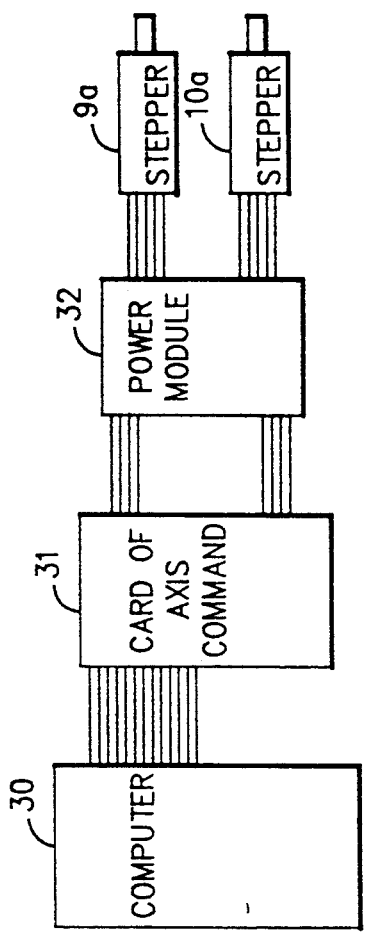
FIGS. 15 and 16 are schematic drawings showing computer interface to the stepper motors and to the telemeter.

The step-by-step control of the stepper motors 9a, 10a, by the computer is carried out as shown in the diagram of FIG. 15. The computer 30 is linked to the stepper motors 9a, 10a through an interface. This interface includes a circuit card 31 capable of piloting one or several stepper motors, depending on the card configuration. Following the interface card 31 is a power module 32 that is adapted to the stepper motors to be driven. The power module 32 amplifies the logic signals delivered by the card 31 and converts the signal into excitation current for the motors 9a, 10a. The positioning of the motors is carried out in open loop. That is, the motors do not provide the system with feedback information about the actual positioning of the stepper motors. Instead the computer 30 sends to the card 31, for each motor 9a, 10a, a message describing the desired rotating direction and the number of steps to be executed in this direction. The program assumes that the motors actually move to the directed position.

Figure 16:
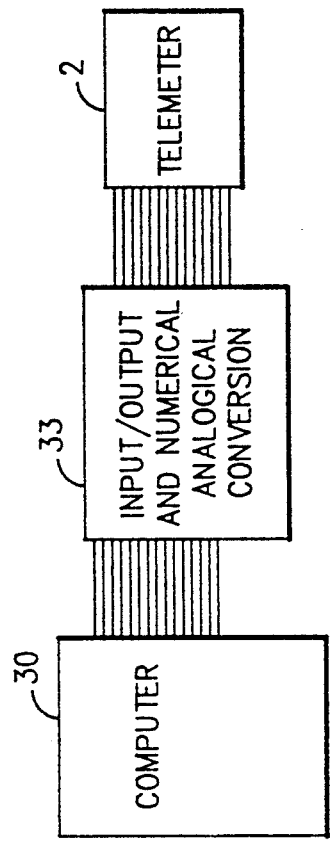

The computer 30 is hooked up to the telemeter 2, as shown in FIG. 16, through numerical inputs/outputs and at least one analog input. A first group of the inputs/outputs allow the computer 30 to send commands to the telemeter 2 and receive data concerning the measure of distance to the appropriate target 16. The analog input converts the data of light intensity delivered as high voltage level, into numerical form understandable by the computer 30. If desired, these data can be converted into numerical form by the telemeter itself, if the telemeter is equipped with adequate electronics. As described previously, the value of reflected light intensity is useful in precisely acquiring the center of the target 16.

The system described hereinabove can be carried out another way, additionally using a system of artificial vision. For this purpose, the computer is equipped with an interface and video picture processing card. This card is itself linked to a video camera mounted on the head of the telemeter. This artificial vision system allows the operator to prelocate the targets under the vehicle. The software, which can recognize the circular shape of the targets 16, which have a very particular brightness, can easily locate the targets on a video picture and so deduce their angular coordinates, approximately. When all targets 16 have been located, a centering and measuring operation is commenced, either automatically or by operator command, using the technique described previously based on the reflected light intensity.

This system permits the apparatus to function fully automatically.

As is evident from the foregoing, the invention contributes a significant improvement to the existing art by supplying a device for checking the positions of characteristic points of a vehicle, permitting verification, without contact with the vehicle and without any special intervention thereon, the conformity of its dimensions relative to the theoretical dimensions.

Furthermore, this device can also be used for vehicle repair, as it enables the operator to determine which are the deformed zones of the vehicle and what the value of the deformation is, and this enables him to determine how to intervene on the vehicle to restore its conformity to the original dimensions.

It should be noted that it would be possible to envisage measuring methods other than with laser telemeters, e.g., an acoustic or radio device, without going outside the scope of the invention.

What is claimed is:

1. Apparatus for checking the relative positions of two or more predetermined points on a vehicle, comprising:
    a laser telemeter for measuring distance therefrom to a respective target positioned at each of said predetermined points, including means for producing a beam which is reflected back to the telemeter,
    first and second stepper motor assemblies for orienting the telemeter about first and second mutually perpendicular axes by steps,
    a computer that includes means for storing in memory the respective number of steps about each said axis from a reference orientation to the orientation of the telemeter at which the beam is centered on the target, means for calculating distance from the telemeter to each said target and based on the respective stored number of steps an angle of rotation about each said axis corresponding to the position of the respective target, means for calculating from the distance from the telemeter to each said target and from the respective angles of rotation about each said axis respective XYZ coordinates for the position of each said target, and means for calculating from said XYZ coordinates relative positions of said targets from one another, comparing said relative positions with predetermined standard values for producing discrepancy values DX, DY, DZ; and
    means for printing or displaying the discrepancy values for each said target position.

2. Apparatus for checking predetermined points on a vehicle, according to claim 1 further comprising a plurality of targets to be attached to respective ones of said predetermined points, each said target being provided with peripheral reflective means permitting automatic acquisitioning and centering of the target by the telemeter laser beam and a central reflective dot.

3. Apparatus for checking predetermined points on a vehicle according to claim 2 wherein each said target is in the form of a disk having a peripheral reflective ring, a non-reflecting disk portion within said reflective ring, and said dot centered in said disk portion.

4. Apparatus for checking predetermined points on a vehicle according to claim 3 wherein said ring and dot are formed of a reflective film of the type that reflects incident light back in the direction towards its source.

5. Apparatus for checking predetermined points on a vehicle according to claim 4 wherein said telemeter includes means for sensing the intensity of reflected light returned thereto from said targets, and said computer is suitably programmed to operate each of said stepper motor assemblies to displace the beam of the laser beam on each said target and based on the stepper motor angular positions at which maximum intensity is detected, calculate the position of the associated reflective dot and automatically center said telemeter laser beam on the dot.

6. Apparatus for checking predetermined points on a vehicle according to claim 1 wherein said computer includes memory means for storing as said standard values coordinates of said predetermined points as furnished by a manufacturer of said vehicle.

7. Apparatus for checking predetermined points on a vehicle according to claim 1 wherein a prepositioned target is incorporated into a chassis of said telemeter at a predetermined distance and angle, thus to permit calibration of the telemeter and automatically compensate for temperature and atmospheric variations.

8. Apparatus for checking predetermined points on a vehicle according to claim 1 further comprising a chassis in which said telemeter is mounted, and which is positionable at either side of said vehicle.

9. Apparatus for checking predetermined points on a vehicle according to claim 1 further comprising mounting pieces to be affixed on front and rear wheels of said vehicle, each said mounting piece mounting a rim of the associated wheel and having a central portion on which an associated one of said targets is mounted.

10. Apparatus for checking predetermined points on a vehicle according to claim 1 wherein said vehicle has points of attachment for struts or shock absorbers, and further comprising at least one gantry having support devices which attach onto said points of attachment and include means for mounting one of said targets at a predetermined position on said at least one gantry.

11. A process for checking the relative positions of two or more predetermined points on a vehicle, comprising:
    positioning at each of said predetermined points a target that includes means to reflect incident light back towards its source;
    positioning adjacent said vehicle a laser telemeter for measuring distance therefrom to any of said targets, including first and second stepper motor assemblies for orienting the telemeter about each of first and second mutually orthogonal axes;

orienting said telemeter to direct its laser beam onto each of said targets in turn by controllably actuating said stepper motor assemblies until said laser beam is incident on a center of the associated target, and storing for each target a distance measurement from the telemeter to the target and angular displacement information for each said axis based on the displacement of each of said stepper motor assemblies;

calculating, for each said target, from the respective distance measurement and angular displacement information the position of the target in XYZ coordinates, calculating relative positions of the targets from one another, comparing the calculated relative positions with predetermined standard values appropriate for said vehicle to produce discrepancy values, and printing or displaying the discrepancy values for each said target position.

12. The process of claim 11 wherein the steps of storing distance measurements and angular displacement information, calculating, and comparing are carried out automatically in a suitably programmed computer.

13. The process of claim 11 further comprising calibrating said telemeter by orienting same at a fixed target at a known distance and angular orientation relative to the telemeter.

14. The process of claim 11 wherein said orienting the telemeter includes acquiring each said target roughly by steering the laser beam until it is incident on the target, wherein each target is in the form of a disk having a peripheral ring of predetermined diameter formed of a back-reflective material, a darkened disk portion within the ring, and a dot of said back-reflective material disposed at the center of said disk portion, and centering the laser beam on said dot by driving one of said stepper motor assemblies while monitoring the intensity of light reflected by the ring until two angular positions are recorded at which the reflected light intensity is a maximum, driving the other of the stepper motor assemblies until another angular position is recorded at which the reflected light intensity is a maximum, driving the other of the stepper motor assemblies until another angular position is recorded at which the reflected light intensity is again a maximum, computing the angular position of said central dot based on said recorded angular positions and the predetermined diameter of the ring, and driving said stepper motor assemblies to position the telemeter laser beam at said dot.

* * * * *